Dec. 10, 1963 R. G. OLSON 3,113,590
CONTROL VALVE
Filed May 18, 1961
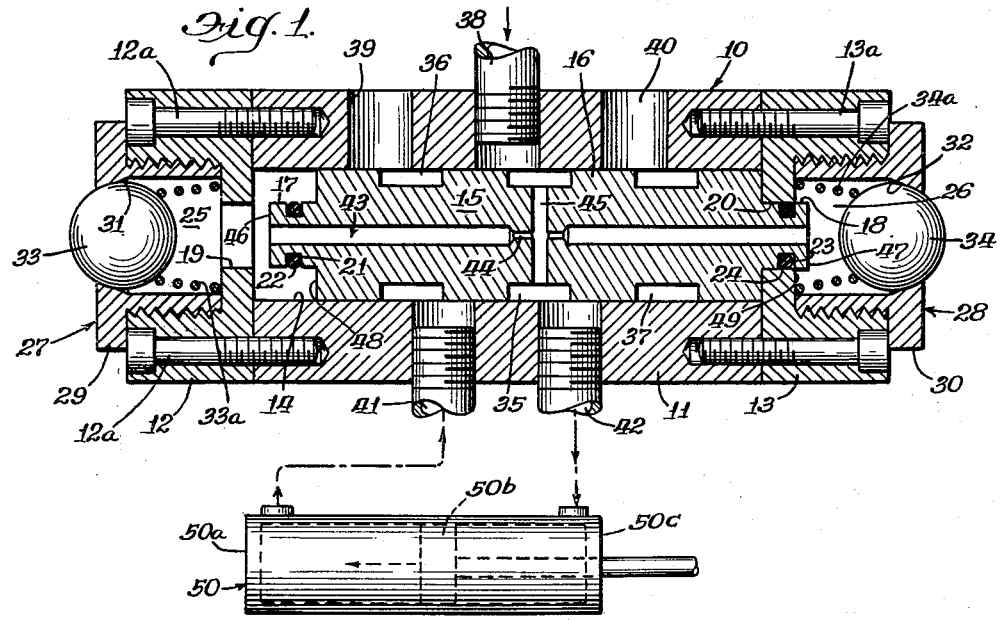
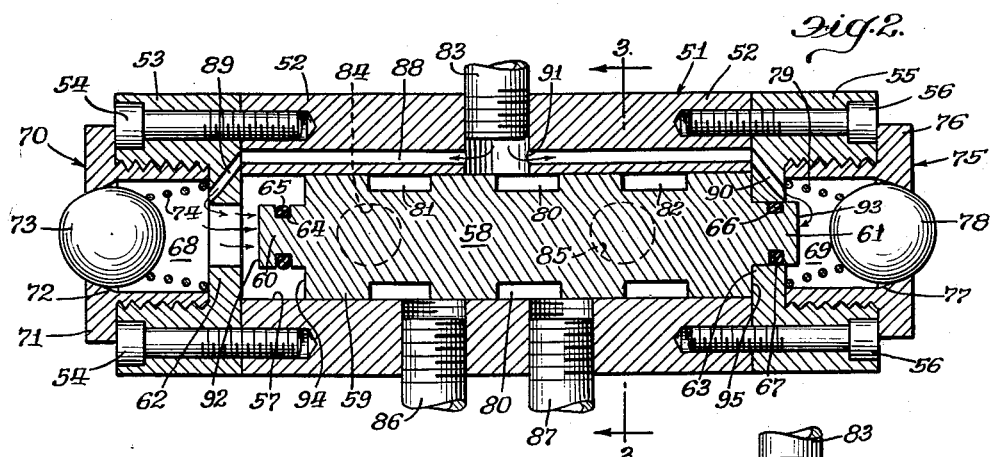
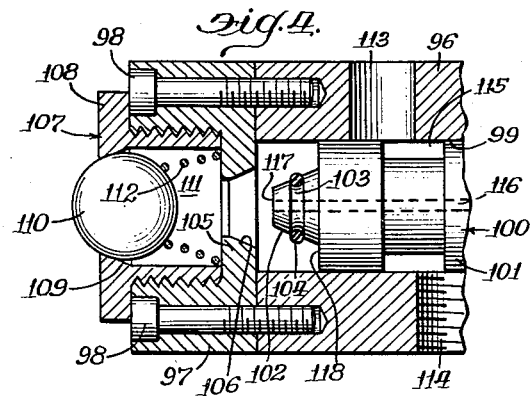
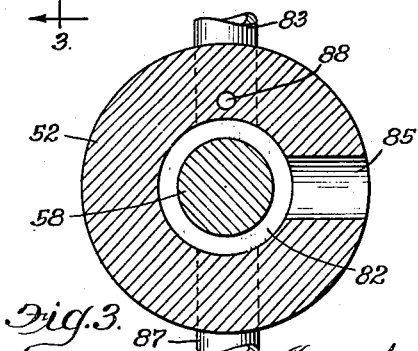
Inventor:
Raymond G. Olson
By: Snow and Benno
Attys.

United States Patent Office 3,113,590
Patented Dec. 10, 1963

3,113,590
CONTROL VALVE
Raymond G. Olson, Niles, Ill., assignor to Power Control
Products, Inc., a corporation of Illinois
Filed May 18, 1961, Ser. No. 110,939
4 Claims. (Cl. 137—625.6)

This invention relates to a new and improved control valve.

Control valves control fluid under pressure for delivery of the fluid to various devices such as cylinders to be operated. These may be hydraulic, air or other gas operated devices. In the usual arrangement of control valves it is desirable to be able to direct fluid under pressure to one end of a cylinder to be operated and remove the fluid from the other end of the cylinder and exhaust it either to a reservoir or to atmosphere. It is also desirable to be able to reverse this direction of fluid flow so that fluid under pressure may be delivered to the other end of the cylinder and then exhausted from the first end of the cylinder to a reservoir or atmosphere. The control valve performs this function. One such control valve is shown in my issued patent 2,729,242.

It is a principal object of the present invention to provide a control valve in which a sliding spool is held in either end of its movement by a differential in fluid pressures exerted on the ends of the sliding spool.

An important object of this invention is to provide a spool valve with reduced diameter extensions on each end thereof and adapted to cooperate with radially inwardly projecting annular flanges at the ends of the housing which define substantially the same diameters as the external diameters of the extensions on the slide valve and the housing having fluid chambers adjacent the ends of the slide valve and these elements constituting the means for defining the differential pressure areas for holding the spool valve in one end of the housing.

Another important object of this invention is the provision of a control valve having a longitudinally extending passage communicating to each end thereof and further communicating with the inlet of the fluid under pressure whereby fluid under pressure is delivered to both ends of the control valve and the ends of a sliding spool having differential areas whereby the fluid under pressure will cause the spool to be held in that end of the housing opposite the end having the greatest area to receive fluid pressures.

Still another important object of this invention is to equip a differential pressure valve of the spool type wherein cavities are provided at each end of the valve housing with poppet valves to the exterior, and the valve spool having a communicating passageway from one end cavity to the other and to the inlet or source of origin of the fluid under pressure.

Still another important object of this invention is to provide a restricted orifice in a communicating passageway from the source of fluid under pressure to valve end cavities for the purpose of bleeding the end cavities and thus enabling a shifting of the valve spool to one end or the other of a housing carrying the valve spool.

Another and still further important object of this invention is the provision in a control valve for effecting a shifting of a valve spool therein to one end or the other depending upon a differential in pressure at one end over the other end and held in that position by this differential in effective area for actuation by the fluid under pressure within the end cavities.

A still further important object of this invention is to provide a control valve with a valve spool having reduced diameter and extensions cooperating with inwardly projecting annular flanges of substantially the same diameter as the valve spool extensions and having sealing means interposed therebetween and said elements cooperating to expose either only the reduced diameter end extension or the full diameter of the valve spool depending upon the endwise position of the valve spool thereby creating a differential in area which in turn produces a differential in pressure for effecting a secure holding of the valve spool in one end thereof.

Another and further important object of this invention is the provision of a fluid operated control valve capable of being actuated either at the position of the valve or at a position remote from the valve.

Another and still further important object of this invention is to provide a fluid control valve with a reciprocally sliding spool and means for actuating movement of the spool from one end to the other and holding said spool in its shifted position by a differential in effective fluid pressures within the ends of the valve and the operation of the valve not being adversely affected in spite of small leakages of fluid within the valve.

Another important object of this invention is to equip a control valve having a differential in effective area at the ends of a reciprocally sliding spool to cause a holding of the spool in one end of the valve and the differential accomplished by tapered extensions on the spool cooperating with comparably tapered internal annular flanges on the housing.

Other and further important objects and advantages will become apparent from the disclosures in the following specification and accompanying drawings.

In the drawings:

FIGURE 1 is a sectional view taken through a control valve of this invention.

FIGURE 2 is a sectional view of a modified form of control valve of this invention.

FIGURE 3 is a sectional view taken on the line 3—3 of FIGURE 2.

FIGURE 4 is a sectional view of a portion of a control valve showing a modified form of construction from that shown in FIGURES 1 and 2.

As shown in the drawings:

Reference numeral 10 indicates generally a housing which includes a central body portion 11 and end caps 12 and 13 which are fastened by means of recessed cap screws 12a and 13a to the central body 11. These units are thus unitary one with the other when the device is in operation. The housing is provided with a central longitudinally extending bore 14 to receive a valve spool 15 for sliding reciprocating movement therein. The spool or slide valve 15 includes a generally elongated central portion 16 of relatively large diameter which is substantially equal to the internal diameter of the central bore of the housing. The valve spool includes reduced diameter extensions 17 and 18 on each end thereof. An inwardly projecting annular flange 19 on the end cap 12 defines an internal passage substantially equal in diameter to the reduced diameter end extension 17, which in one position of the valve spool is disposed therein. Similarly an inwardly projecting annular flange 20 of the end cap 13 defines a passage of internal diameter substantially equal to the external diameter of the end extension 18. An annular groove 21 in the end extension 17 carries a rubber O ring 22 and similarly an annular groove 23 in the end extension 18 carries a rubber O ring 24.

The cross sectional extent of the O rings exceeds the depth of the grooves in which they are mounted.

The rubber O rings 22 and 24 are employed as sealing means between the end extensions 17 and 18 and the passageways defined by the inwardly extending annular flanges 19 and 20 respectively of the end caps 12 and 13.

The term rubber as used herein is intended to include its common meaning of natural and synthetic rubbers or any similar compressible material capable of acting as a sealing means. An O ring is a common term meaning a ring of rubber used as a sealing means between elements.

An end chamber or cavity 25 is defined by and disposed in the end cap 12. Similarly an end chamber or cavity 26 is defined by and is disposed in the end cap 13. A bushing 27 is threadedly engaged within the end cap 12 and a similar bushing 28 is threadedly engaged in the opposite end cap 13. The bushing 27 is provided with an outwardly extending annular flange 29 and similarly the bushing 28 is provided with an outwardly extending annular flange 30. A valve seat 31 is provided in the bushing flange 29 and a valve seat 32 is provided in the bushing flange 30. A valve 33 in this instance shown as a ball cooperates with the seat 31 and is disposed in the end cavity 25. Similarly a ball valve 34 within the end cavity 26 cooperates with the seat 32 to effect a sealing of the end cavity 26. It should be understood that any type of valve may be employed to bleed fluid from the end chambers.

The valve spool 15 as depicted is provided with an annular groove 35 around the center of the outside thereof. A spaced apart annular groove 36 is provided in the spool 15 on one side of the generally centrally disposed groove 35. A third annular groove 37 is spaced apart from the annular groove 35 on the other side thereof and thus there are three parallel annular grooves generally equally spaced apart along the length of the valve spool 15. It should, however, be understood that the valve spool may be equipped with different arrangements of grooving and not depart from the principle of this invention.

The housing 11 is provided with an inlet passage 38 which is in general communication with the central annular groove 35 in the valve spool regardless of the position of the valve spool in the housing 10. The housing also includes an exhaust passage 39 and a spaced apart exhaust passage 40. These passageways are disposed on each side of the inlet passage 38 and are spaced apart a distance substantially equal to the spacing of the annular grooves in the valve spool. The housing is further provided with a passageway 41 leading to one end of a fluid cylinder 50 which is to be operated and a spaced apart passage 42 which leads to the other end of the fluid cylinder. The passageways 41 and 42 are disposed on an opposite side of the housing and generally intermediate the passageways 38, 39 and 40. In one endwise position of the valve spool 15 fluid under pressure is directed to the passageway 41 and exhausted through the passageway 42. In the other endwise position of the valve spool 15 fluid under pressure passing through the inlet port 38 in the housing 11 will pass through the annular groove 35 and into the spaced apart passage 42 for delivery to the other end of the fluid cylinder. In this position the fluid in the other end of the cylinder 50 will be exhausted through the passageway 41 and thence around the annular groove 37 back to a reservoir or atmosphere, depending upon the installation. In the position as shown in the drawing fluid under pressure is delivered to the passageway 41 and is returned through the passageway 42 and thence through the annular groove 36 and out the exhaust passage 39 in the housing.

As shown in FIGURE 1 the valve spool 15 is provided with a longitudinal passage 43 extending from one end thereof to the other and joining the chambers 25 and 26 within the end caps 12 and 13, respectively. A restricted orifice 44 is provided in the center of the passageway 43. A transverse passage 45 joins the longitudinal passage 43 at substantially the position of its restriction 44 to the central annular groove 35 which as previously stated has direct communication with the inlet port 38 in the housing 10.

It is important to the operation of this invention to utilize the end areas of the valve spool in maintaining the valve spool in either one of its endmost positions. The end area of the reduced diameter extension 17 is defined as the area 46. Similarly 47 defines an end area of the reduced diameter end extension 18. The reference numeral 48 defines an end area of the annular ring outside of the end extension 17 on the valve spool 15. Similarly 49 defines an end area of the annular ring outside of the end extension 18.

In operation of the device of FIGURE 1 fluid entering through the inlet port 38 in the housing 10 is directed through the annular groove 35 of the spool 15, then inwardly through the transverse passage 45 and thence through the restricted orifice 44 and out through each end of the longitudinal passage 43 to the end cavities or chambers 25 and 26. The construction of the device is such that the fluid in the end chamber 25 acts to exert pressure over both the areas 46 and 48 as against the other end wherein fluid in the end chamber 26 will act only over the area 47. The combined areas 46 and 48 are substantially in excess of the area 47 and hence the spool 15 is normally held in the position as shown in the drawings. However, if the fluid from the end chamber 25 is bled off from that end by depressing the ball 33 to thereby permit the high pressure side to have certain of its fluid exhausted through or past the ball 33, the pressure against the area 47 on the other end of the spool then becomes adequate to cause the spool to shift to the other end of the housing, whereupon the reduced diameter end 17 enters within the inwardly projecting annular flange 19 on the end cap 12 and simultaneously the reduced diameter end 18 at the other end of the spool comes out from its engagement with the inwardly projecting annular flange 20 thus making the other end of the valve the high pressure side, and the end which is shown in the drawing as the high pressure side becomes the low pressure side. In the movement of the valve spool from one end to the other there is a point where the O ring seal is broken causing the full area of the valve spool end to be made available to receive the fluid under pressure. This of course makes the valve spool shift at a very high speed. Regardless of the end of the housing in which the valve spool is located, if the high pressure side is bled off, the spool will shift to the end of the fluid bleed off. The shifting of the valve spool of course causes fluid under pressure to be delivered to one end or the other end of the device, such as the cylinder 50, to be operated. When the high pressure side of the control valve is bled off by a depression of its associated ball valve, the low pressure side is still sealed and cannot be readily exhausted through the communicating passage 43 through the valve spool because of its centrally disposed restricted orifice 44. This previous low pressure end then exceeds the pressure of the previous high pressure end causing the valve spool 15 to immediately shift to the other end of the housing and thus redirect fluid under pressure from the inlet to the other end of the cylinder 50. The admission of fluid under pressure from the passage 41 to the end 50a of the cylinder 50 causes a piston 50b to move toward the end 50c of the cylinder. The fluid in the end 50c of the cylinder 50 is carried back to the control valve through the passage 42 and thence to the exhaust port 40. However, in the position of the valve spool 15 in FIGURE 1 fluid under pressure is delivered to the end 50c of the cylinder causing the piston 50b to move in the direction of the arrow toward the end 50a of the cylinder. Here fluid is exhausted through the passage 41 to the exhaust port 39.

As best shown in FIGURE 2 there is shown a modified form of the control valve of this invention. Generally the device is very similar to the device of FIGURE 1 but for one particular modification which will be explained in detail. The control valve of FIGURE 2 has a housing 51 consisting of a central portion 52 with an end cap 53 held to one end by means of recessed cap screws 54 and an end cap 55 fastened to the other end by means of recessed cap screws 56. The central housing portion 52 is provided with a longitudinally extending bore 57 disposed substantially centrally therewithin. A valve spool 58 is slidably mounted within the bore 57. The positioning of the valve spool 58 in either end of the housing causes fluid under pressure to be directed to one end or the other of a cylinder to be operated such as that shown at 50 in FIGURE 1.

The valve spool 58 is provided with a central portion 59 having a relatively large diameter. The central portion of the spool is substantially equal in external diameter to the internal diameter of the cylindrical bore 57. The valve spool is equipped with end extensions having reduced diameters as shown at 60 and 61. The end cap 53 is provided with an inwardly projecting annular flange 62 which defines a passage of substantially equal internal diameter to the external diameter of the reduced diameter end extension 60. Similarly the end cap 55 is provided with an inwardly projecting annular flange 63 which defines an internal passage substantially equal in external diameter to the reduced diameter end extension 61.

An annular groove 64 is provided around the end extension 60 for the purpose of receiving a rubber O ring 65. It is this rubber O ring which prevents fluid under pressure from passing from the end cap to the central housing bore by reason of its sealing engagement with the inwardly projecting annular flange of the end cap. A similar annular groove 66 is provided in the end extension 61 to receive a rubber O ring 67, which as in the case of the rubber O ring 65 effects a seal with the internal annular flange of the end cap when the end extension projects within the inwardly projecting annular flange.

The end cap 53 defines a chamber 68 therewithin while the end cap 55 defines a similar chamber or cavity 69. A bushing 70 threadedly engages the end cap 53. The bushing 70 is provided with an outwardly extending annular flange 71 which abuts the end face of the cap 53. The bushing flange 71 is provided with a valve seat 72 formed therewithin to receive a valve 73 in cooperation therewith. The valve, in this instance a ball, is disposed within the end cavity 68 and is normally urged against the valve seat 72 by means of a light spring 74, but it should be understood the fluid under pressure within the end chamber is sufficient in itself to hold the valve against the seat. Similarly a bushing 75 threadedly engages the end cap 55 and is provided with an outwardly extending annular flange 76 to abut the outer end face of the cap 55. A valve seat 77 is formed in the bushing flange 76 and is adapted to cooperatively receive a ball valve 78 for sealing engagement of fluid within the end cap chamber. Here again a light spring 79 is adapted to hold the ball valve against the valve seat 77 and within the end cap chamber 69.

The valve spool 58 is provided with an annular groove 80 around the center thereof. Similarly a spaced apart annular groove 81 is provided on one side of the groove 80 and another spaced apart annular groove 82 is disposed on the other side of the groove 80. The housing 51 is equipped with a fluid inlet passage 83 which is in communication with the central annular groove 80 in the valve spool regardless of the position of the valve spool within the housing. The housing 51 is provided with exhaust passages 84 and 85 disposed on either side of the inlet passage 83 and also disposed at a quarter turn around the housing from the inlet passage 83 as clearly shown in FIGURE 3. The housing is further provided with a passage 86 leading to one side of a cylinder to be operated (not shown) and a second spaced apart passage 87 leading to the other side of this cylinder to be operated. It should be understood that the cylinder is of the type shown at 50 in FIGURE 1.

In the valve of FIGURE 1 there is a longitudinally extending passageway 43 through the valve spool 15. This passageway 43 provides intercommunication between the end chambers with the cross passage 45 joining it to the inlet fluid under pressure. In the modified device of FIGURE 2 the passage joining the end chambers and the fluid pressure inlet runs through the housing rather than through the sliding valve. A longitudinal passage 88 is shown in FIGURE 2 extending through the length of the central portion 52 of the housing 51 and with the aid of an extension passage 89 in the end cap 53 and an extension passage 90 in the end cap 55 there is direct communication between the end cap chambers 68 and 69. Both of the passage extensions 89 and 90 are disposed at an angle downwardly and inwardly to reach the chambers 68 and 69 respectively. As further shown in FIGURE 2, there is a juncture of the passage 88 with the inlet passage 83 as shown at 91 to thereby provide for a common access of incoming fluid under pressure to both of the end cap cap chambers 68 and 69. For purposes of explaining the operation, the end of the extension 60 is identified by the numeral 92 and the end of the extension 61 is identified by the numeral 93. An annular ring 94 outside of the end extension 60 is identified by the numeral 94 while the annular ring 95 outside of the end extension 61 is identified by the numeral 95.

The operation of the modified form of control valve as shown in FIGURE 2 is identical to the operation of the control valve of FIGURE 1. However, the structure accomplishing this same function or operation is somewhat different in that the communicating passage between the end chambers or cavities 68 and 69 is through the stationary housing rather than through the reciprocating sliding spool 58, such as shown at 43 in the sliding spool 15 in FIGURE 1. Fluid under pressure delivered to the inlet passage 83 from where it passes through the annular groove 80 to the passage 87 for delivery to some device to be operated such as the cylinder 50 shown in FIGURE 1. Simultaneously, fluid under pressure is delivered outwardly through the longitudinally extending passage 88 to both end chambers 68 and 69. In the position of the valve spool 58 as shown in FIGURE 2, the fluid under pressure within the end cap chamber 68 has access to both the end 92 of the reduced diameter extension 60 and the annular ring 94 extending to the full large diameter of the central portion 59 of the sliding spool 58. Thus fluid under pressure in the end chamber 68 has a large area or surface against which it may act to hold the spool 58 in the position it is shown in FIGURE 2. This is true because the fluid under pressure in the other end chamber 69 has access only to the area 93 of the reduced diameter extension 61 and thus there is a differential in areas against which the fluid under pressure may act. The area on the exposed end of the spool 58 is substantially greater than the restricted end and this causes a retention of the spool 58 in its present position. The fluid under pressure within the chambers 68 and 69 is also urging outwardly on the ball valves 73 and 78, thereby preventing passage of fluid under pressure past the valve seats 72 and 77. The reason, of course, for the differential in areas of effective pressures is occasioned by the sealing of the extension 61 with the inwardly projecting annular flange 63 of the end cap. The seal between these elements is further enhanced by the use of the rubber O ring 67 providing a positive sealing element between the extension 61 and the inwardly projecting annular flange 63. Now when the valve 73 is depressed, permitting a bleeding of the fluid under pressure within the chamber 68 past the valve seat 72, the effective action of fluid within the chamber 68 against the end of the spool 58 becomes less than the force of the fluid under pressure in the chamber 69 against the small effective area 93 on the other end of the spool so that even though fluid under pressure acts only against this reduced diameter end extension, it is sufficient to move the spool 58 into the now exhausted end of the control valve. This causes an immediate exposure of the large annular ring 95 and an accelerated movement of the spool 58 is occasioned as soon as this area becomes open to urging action by the fluid under pressure within the chamber 69. Of course, as the spool 58 moves endwise the extension 60 slides within the inwardly projecting annular flange 62 of the end cap 53, thereby providing an effective seal by reason of the rubber O ring 65 with this flange and thereby reversing the position of the differential areas of effective pressure within the control valve and holding the spool in the other end for reversal of delivery of fluid to a device to be operated, such as the cylinder 50. It is apparent, therefore, that the operation of devices as shown in FIGURES 1 and 2 are substantially identical while the means for accomplishing these identical operations are changed in that in FIGURE 1 the passage runs through the sliding spool 15, while in FIGURE 2 the passage runs through the stationary housing.

A further modification of the control valve of this invention is shown in FIGURE 4. The control valve of FIGURE 4, which has only been shown in part, contains many of the same elements of the control valves of FIGURES 1 and 2. The housing includes a central portion 96 and an end cap 97. Recessed cap screws 98 are shown joining the end 97 to the central housing 96. Obviously the other end of the control valve not shown is constructed in the same manner. The housing has a central bore 99 to receive a spool valve 100 slidable from one end to the other. As in the case of the control valves of FIGURES 1 and 2, the slidable spool contains a large diameter central portion 101 with end extensions as illustrated by the extension 102 on the one end thereof. However, the extension 102 differs from the end extensions as shown in FIGURES 1 and 2 in that it tapers outwardly. An annular groove 103 is provided around the tapered extension 102 and receives a rubber O ring 104. The O ring 104 acts as a seal between the tapered extension 102 and a portion of the end cap to be described. A radially inwardly projecting annular flange 105 is provided on the end cap 97 and is equipped with a tapered opening 106 to match the taper of the extension 102. It is thus in cooperation with this tapered opening that the rubber O ring 104 effects a seal and prevents passage of fluid from the end cap to the central bore 99.

A bushing 107 threadedly engages the end cap 97 and is provided with an outwardly extending flange 108 to abut the outer face of the end cap 97. A valve seat 109 is formed in the bushing 107 and enables a seal to be effected between the end cap and the atmosphere by engagement of the seat by a valve 110. The valve, in this instance a ball, cooperates with the seat 109. A chamber or cavity 111 is formed within the end cap 97 and houses the ball valve 110. A light spring 112 is positioned against the ball and within the chamber 111 tending to hold the ball valve 110 in engagement with the seat 109.

The housing 96 is provided with an exhaust passage 113 and a passage 114 leading to one end of a cylinder, or the like, to be operated, such as that shown at 50 in FIGURE 1. In the portion of the control valve shown in FIGURE 4, the spool has an annular groove 115 in communication with the passages 113 and 114 in the housing 96. A longitudinal passage 116 through the valve spool 100 is provided to permit intercommunication between the spaced apart end chambers 111 and with the fluid inlet as in the device of FIGURE 1, whereby fluid under pressure is permitted to enter both ends of the control valve. By means of the engagement or disengagement of the end extensions of the spool with the inwardly projecting flanges on the end caps there is provided an effective area of fluid pressure engagement differing from one end to the other. In the portion of the valve shown in FIGURE 4, it is of course obvious that fluid under pressure within the chamber 111 may have effective contact with not only the end 117 of the extension 102, but also of the annular ring end 118 defined by the end extension 102 and the outer circumference of the enlarged central portion 101 of the valve spool.

The operation of the control valve of FIGURE 4 is substantially identical to the operation of the control valve of FIGURE 1 but for the quicker action of releasing and engaging of the tapered end extension with the tapered opening in the inwardly projecting annular flange on the end caps. In the cylindrical extensions of both FIGURES 1 and 2 the rubber O rings must slide within cylindrical openings, whereas in the control valve of FIGURE 4 the rubber O ring 104 merely slides in and abuts against the cooperatively tapered opening. This, of course, facilitates releasing of the seal as well as facilitating engagement.

The tapered and extensions thus enhance the speed of response of the sliding spool and when the ball valve 110 is opened to permit escape of fluid from the chamber 111 the spool 100 quickly moves toward that end and causes a sealing of the tapered end extension 102 with the tapered opening 106. In this new position the spool will remain fixed until the other end of the valve is bled off because of the differential areas of effective pressure. When the extension is sealed with the annular flange of the end cap the fluid under pressure in the chamber 111 can only act against the reduced diameter end extension as against the other end which has the full area of the end of the spool to engage.

It should be understood that the size of the end extensions relative to the large diameter of the valve spool has a direct relation to the speed of movement of the valve spool and also the force with which it is held against movement. As the ratio of extension size to spool size becomes higher, the holding power of the spool against shifting increases and it follows that a greater bleeding is required to effect a shifting of the spool. However, the control valve of this invention is enhanced because there is no necessity of making the seals perfect because it will effectively operate in spite of minor leakages. This is true because fluid under pressure is constantly replenished to the end chambers and hence the leaks would have to exceed the longitudinal passage size.

Another advantage of the control valve of this invention is to permit operation at some remote position by fluid means. For example a flexible hose or tube could be fastened to the end cap and a valve provided at the end of the tube in lieu of the ball valves mounted directly on the housing end caps. With such a modification the fluid under pressure in the ends could be bled at this remote tubing end to effect a shifting of the valve spool.

I am aware that numerous details of construction may be varied throughout a wide range without departing from the principles disclosed herein and I therefore do not propose limiting the patent granted hereon otherwise than as necessitated by the appended claims.

What is claimed is:

1. A control valve comprising a housing having a cylindrical bore therein, a cylindrically shaped slide valve slidable in said cylindrical bore, end caps mounted on said housing over the ends of said slide valve, each end of said slide valve having a reduced diameter extension, each of said reduced diameter end extensions having an annular groove therein, rubber O rings positioned in each of said annular grooves in the end extensions, said rubber O rings having a cross sectional extent exceeding the depth of said annular grooves, each of said end caps having an inwardly projecting annular flange substantially equal in diameter to the diameter of the slide valve end extensions, said rubber O rings effecting a positive seal between the end extensions and the inwardly projecting annular flanges, said slide valve having longitudinally spaced apart annular grooves, said housing having fluid inlet and outlet passages therein for communication with certain of the annular grooves in the slide valve, said end caps defining fluid chambers and having bleeder means, and said control valve having passage means joining said end cap fluid chambers.

2. A control valve comprising a housing, a valve spool slidable in said housing, said valve spool having longitudinally spaced apart annular grooves, said housing having fluid inlet and exhaust passages therein in communication with said annular grooves, said housing having a fluid chamber in each end of the control valve adjacent the ends of the valve spool, said control valve having a longitudinally extending passage joining said fluid chambers and said fluid inlet, means intermediate the ends of the valve spool and the housing effecting a differential in effective fluid pressures in the end chambers, whereby when the valve spool is in one endwise position in the housing the differential in effective pressures acts to hold the valve spool in that position, said means effecting the fluid differential including said valve spool having reduced diameter extensions at each end thereof and said housing having radially inwardly projecting annular flanges adjacent each of the fluid chambers and defining openings substantially equal in diameter to the external diameters of the reduced diameter extensions of the valve spool, in which said reduced diameter extensions at each end of the valve spool have annular grooves, and rubber O rings in each of said grooves to effect a positive sealing of the control valve between the reduced diameter extensions and the radially inwardly projecting annular flanges of the housing.

3. A control valve comprising a housing, a valve spool slidable in said housing, said valve spool have longitudinally spaced apart annular grooves, said housing having fluid inlet and exhaust passages therein in communication with said annular grooves, said housing having a fluid chamber in each end of the control valve adjacent the ends of the valve spool, said control valve having a longitudinally extending passage joining said fluid chambers and said fluid inlet, means intermediate the ends of the valve spool and the housing effecting a differential in effective fluid pressures in the end chambers, whereby when the valve spool is in one endwise position in the housing the differential in effective pressures acts to hold the valve spool in that position, said means effecting the fluid differential including said valve spool having tapered extensions at each end thereof, each of said tapered end extensions having an annular groove therein, rubber O rings positioned in each of said annular grooves in the tapered end extensions, and said housing having radially inwardly projecting annular flanges defining tapered internal openings for cooperable sealing engagement by the rubber O rings on the tapered extensions on the valve spool.

4. A control valve comprising a housing, said housing having a generally cylindrical bore therein, a generally cylindrical spool slidable in said bore, said spool having longitudinally spaced apart annular grooves, said housing having fluid inlet and exhaust passages in communication with said annular grooves, said housing having end chambers at each end of said generally cylindrical bore, wall means disposed intermediate each end chamber and said housing bore, each of said wall means having an opening communicating between said end chamber and said bore, said housing having valve means associated with each of said end chambers, said spool having rubber sealing means at each end thereof for separate positive sealing cooperation with said wall means and their openings, whereby a differential in effective fluid pressures on the ends of the spool in said housing is obtained.

References Cited in the file of this patent
UNITED STATES PATENTS

| | | |
|---|---|---|
| 1,921,092 | Newton | Aug. 8, 1933 |
| 2,808,811 | McLaughlin | Oct. 8, 1957 |
| 2,846,981 | Kambic | Aug. 12, 1958 |
| 2,847,879 | Olson et al. | Aug. 19, 1958 |
| 2,870,789 | Bilaisis | Jan. 27, 1959 |
| 2,946,321 | Lieser | July 26, 1960 |